April 13 1926.
J. L. BURNHAM
DYNAMO ELECTRIC MACHINE
Filed August 24, 1922
1,580,810
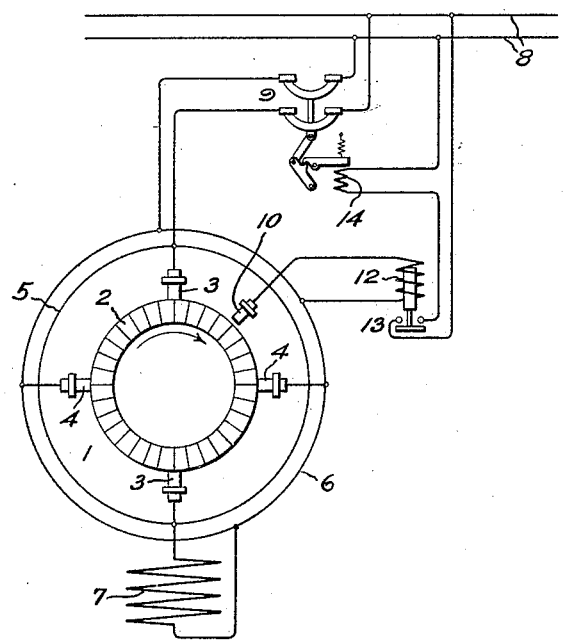
Inventor:
Joseph L. Burnham,
by Albert G. Davis
His Attorney.

Patented Apr. 13, 1926.

1,580,810

UNITED STATES PATENT OFFICE.

JOSEPH L. BURNHAM, OF SCHENECTADY, NEW YORK, ASSIGNOR TO GENERAL ELECTRIC COMPANY, A CORPORATION, OF NEW YORK.

DYNAMO-ELECTRIC MACHINE.

Application filed August 24, 1922. Serial No. 583,954.

*To all whom it may concern:*

Be it known that I, JOSEPH L. BURNHAM, a citizen of the United States, residing at Schenectady, county of Schenectady, State of New York, have invented certain new and useful Improvements in Dynamo-Electric Machines, of which the following is a specification.

My invention relates to dynamo electric machines, and particularly to dynamo electric machines provided with commutators.

Dynamo electric machines provided with commutators are apt to flash or arc over between sets of commutator brushes or between a set of brushes and parts of such machine of opposite polarity or ground upon the occurrence of sudden changes in load. Such flash-overs are generally destructive in that they burn the brush rigging or other parts of the machine. In accordance with my invention, I intend to protect such machines from the destructive action of such flash-overs.

The various features of novelty which characterize my invention are pointed out with particularity in the claims annexed to and forming a part of this specification. For a better understanding of my invention, reference may be had to the following description taken in connection with the accompanying drawing, in which the single figure shows diagrammatically one embodiment of my invention.

Referring to the drawing, 1 is the armature of a dynamo electric machine provided with a commutator 2 on which sets of brushes 3 and 4 bear. The sets of brushes 3 may be considered positive brushes and the sets of brushes 4 negative brushes. The sets of brushes 3 are shown as connected to a bus ring 5 and the sets of brushes 4 are shown as connected to a bus ring 6. The machine is shown as being provided with a field winding 7 connected across the bus rings 5 and 6. The machine is connected to a supply circuit illustrated by mains 8 and is arranged to be disconnected therefrom by a circuit breaker 9. Between two adjacent sets of brushes 3 and 4 on the commutator, a conducting member 10 is placed. This conducting member 10 may be a rod of carbon, which will not be seriously affected by a flash, and is placed in proximity to the commutator 2, but out of contact therewith. It is connected to the circuit breaker 9 so as to open the circuit breaker in case of a flash proceeding from a set of brushes. This flash may occur either between said commutator 2 or brushes 3 and said conducting member. In the particular arrangement shown for accomplishing this, the conducting member 10 is connected to the coil 12 of a relay 13. The relay 13 controls the circuit of an operating coil 14 on a circuit breaker 9.

The operation of my invention is as follows: Assume the armature to be rotating in the direction of the arrow, and that a sudden change in load takes place on the machine, arcing will occur under brush 3, extending in the direction of the conducting member 10. This arcing will complete a circuit from the set of brushes 3 or the commutator 2 to member 10, through relay coil 12 to the bus ring 6 to which the other side of the relay coil 12 is connected as shown. The coil 12 being energized, the relay 13 will pull up, closing the circuit of operating coil 14 on the circuit breaker, thereby opening the circuit.

What I claim as new and desire to secure by Letters Patent of the United States is:

1. In combination, a dynamo electric machine, provided with a commutator and sets of brushes thereon, a conducting member in proximity with said commutator but out of contact therewith and placed between said sets of brushes, a circuit breaker in a circuit of said dynamo electric machine and a relay connected between said conducting member and a point of opposite polarity when flashing on said commutator occurs, said relay controlling said circuit breaker to open the same upon the occurrence of flashing proceeding from one of said sets of brushes.

2. In combination, a dynamo electric machine provided with a commutator and sets of brushes thereon, a conducting member in proximity with said commutator but out of contact therewith and placed between said sets of brushes, a circuit breaker in a circuit of said dynamo electric machine having an operating coil, and a relay connected between said conducting member and a point of opposite potential when flashing on said commutator occurs, said relay controlling the operating coil of said circuit breaker to open the same upon the occurrence of flashing proceeding from one of said sets of brushes.

3. In combination, a dynamo electric machine provided with a commutator and sets of brushes thereon, a load circuit including said commutator and brushes, a circuit breaker associated with said load circuit, said circuit breaker being provided with a normally deenergized tripping coil, and means responsive to flashing upon said commutator for establishing a circuit through said tripping coil and energizing the same and thereby interrupt said load circuit.

4. In combination, a dynamo electric machine provided with a commutator and sets of brushes thereon, a load circuit including said commutator and brushes, a circuit breaker having contacts for opening said load circuit, said circuit breaker being provided with a tripping coil, and means responsive to flashing upon said commutator for establishing a circuit through said tripping coil independent of the circuit controlled by the contacts of said circuit breaker.

5. In combination, a dynamo electric machine provided with a current collection member and sets of brushes thereon, a gap member responsive to flashing upon said current collecting member, a load circuit including said current collecting member and said brushes, a circuit breaker for opening said load circuit, and a normally deenergized relay for controlling said circuit breaker, said gap member establishing a circuit through said relay and energizing the same when flashing on said current collecting member occurs.

6. In combination, a dynamo electric machine provided with a current collecting member and sets of brushes thereon, a gap member responsive to flashing upon said current collecting member, a load circuit including said current collecting member and said brushes, a circuit breaker having contacts for opening said load circuit, and a relay for controlling said circuit breaker, said gap member establishing a circuit through said relay independent of the load circuit controlled by the contacts of said circuit breaker.

In witness whereof, I have hereunto set my hand this 23rd day of August 1922.

JOSEPH L. BURNHAM.